US010449436B2

(12) United States Patent
Duff

(10) Patent No.: US 10,449,436 B2
(45) Date of Patent: Oct. 22, 2019

(54) SKATEBOARD WITH LATERAL WHEEL POSITION

(71) Applicant: ZUP LLC, Williamsburg, VA (US)

(72) Inventor: Glen Wade Duff, Virginia Beach, VA (US)

(73) Assignee: ZUP LLC, Williamsburg, VA (US)

( * ) Notice: Subject to any disclaimer, the term of this patent is extended or adjusted under 35 U.S.C. 154(b) by 0 days.

(21) Appl. No.: 15/669,389

(22) Filed: Aug. 4, 2017

(65) Prior Publication Data

US 2018/0036625 A1    Feb. 8, 2018

Related U.S. Application Data

(60) Provisional application No. 62/371,263, filed on Aug. 5, 2016.

(51) Int. Cl.
| | | |
|---|---|---|
| *A63C 17/01* | (2006.01) | |
| *A63C 17/26* | (2006.01) | |
| *B62K 3/00* | (2006.01) | |

(52) U.S. Cl.
CPC .......... *A63C 17/015* (2013.01); *A63C 17/011* (2013.01); *A63C 17/012* (2013.01); *A63C 17/26* (2013.01); *A63C 17/265* (2013.01); *B62K 3/002* (2013.01); *A63C 2203/14* (2013.01); *A63C 2203/42* (2013.01)

(58) Field of Classification Search
CPC .. A63C 1/02; A63C 1/00; A63C 1/015; A63C 1/014; A63C 1/017; A63C 1/0073
See application file for complete search history.

(56) References Cited

U.S. PATENT DOCUMENTS

| | | | | |
|---|---|---|---|---|
| 323,405 | A * | 8/1885 | Elliot | A63C 17/06 280/11.27 |
| 4,759,558 | A * | 7/1988 | Woods | A63C 17/0073 280/11.28 |
| 8,469,569 | B1 * | 6/2013 | Tunnicliffe | A63C 17/015 280/87.042 |

* cited by examiner

*Primary Examiner* — James A Shriver, II
*Assistant Examiner* — James J Triggs
(74) *Attorney, Agent, or Firm* — Berenato & White, LLC

(57) ABSTRACT

A skateboard having laterally disposed wheels along a diagonal board is disclosed. The board has a generally hour-glass shape, but may include extra clearance for either left or right foot mounting, and pushing off. The board may be equipped with a center handle for gripping in use and for carrying. The wheel trucks may include multiple trucks mounted at each end and offset one from the other at that location. The board may also include a stability and/or steering handle at one end, and caster type wheel trucks for added versatility. Owing to the lateral disposition of foot pads and wheels, a rapid natural gait dismount is made possible.

13 Claims, 13 Drawing Sheets

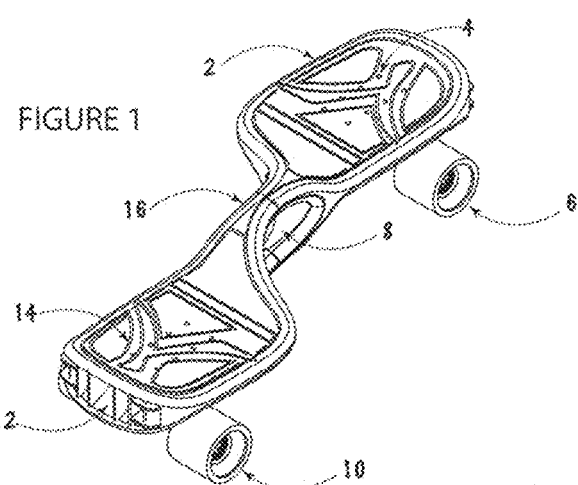
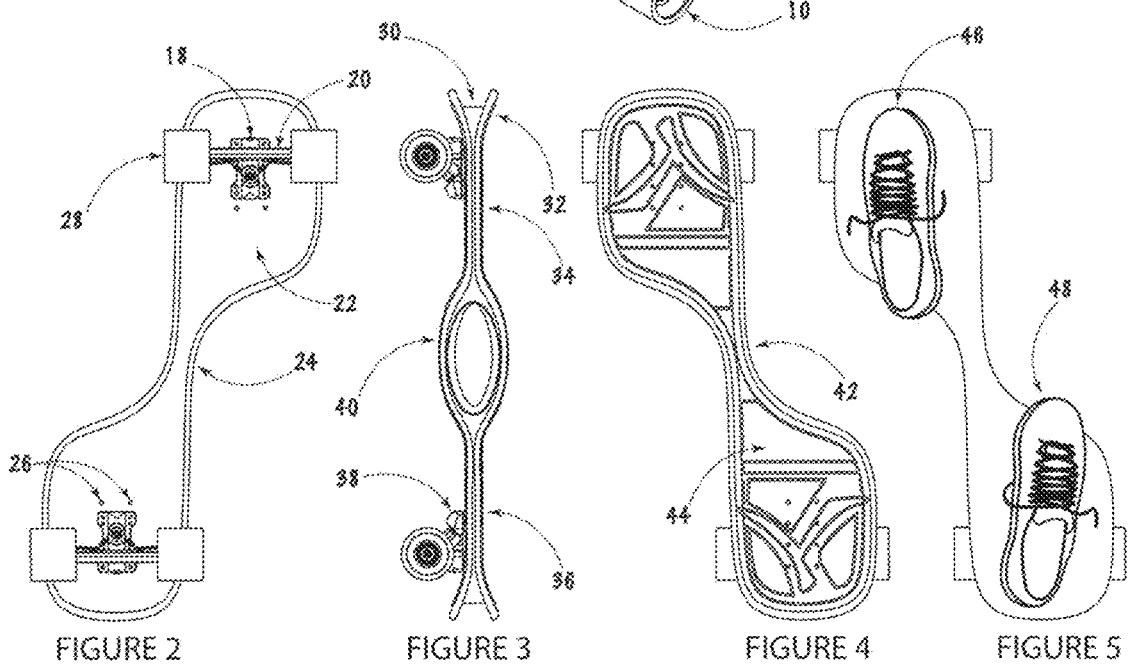
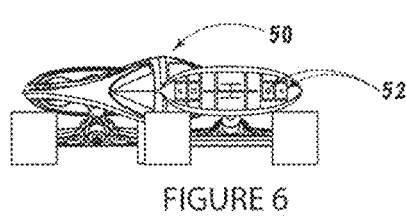

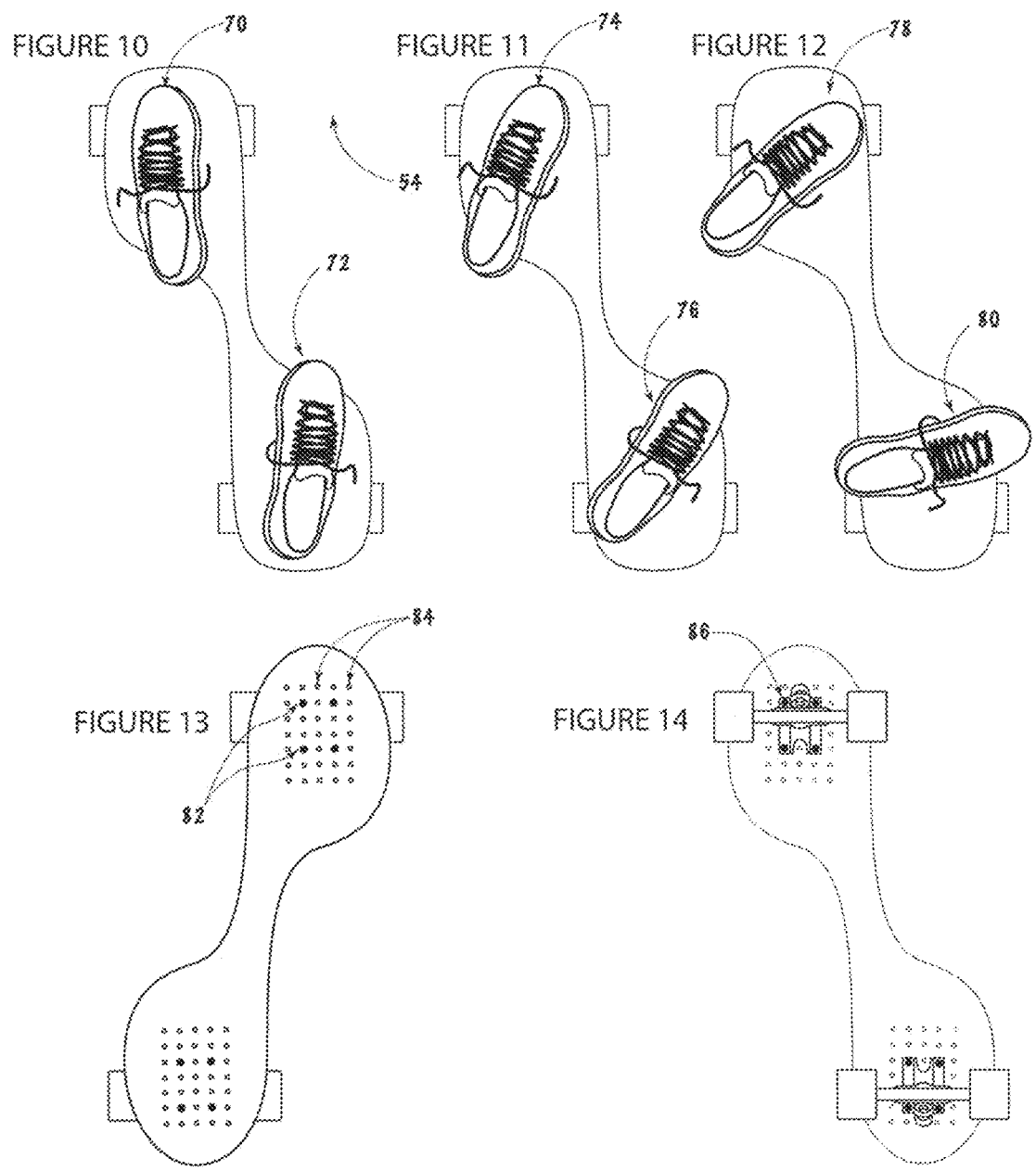

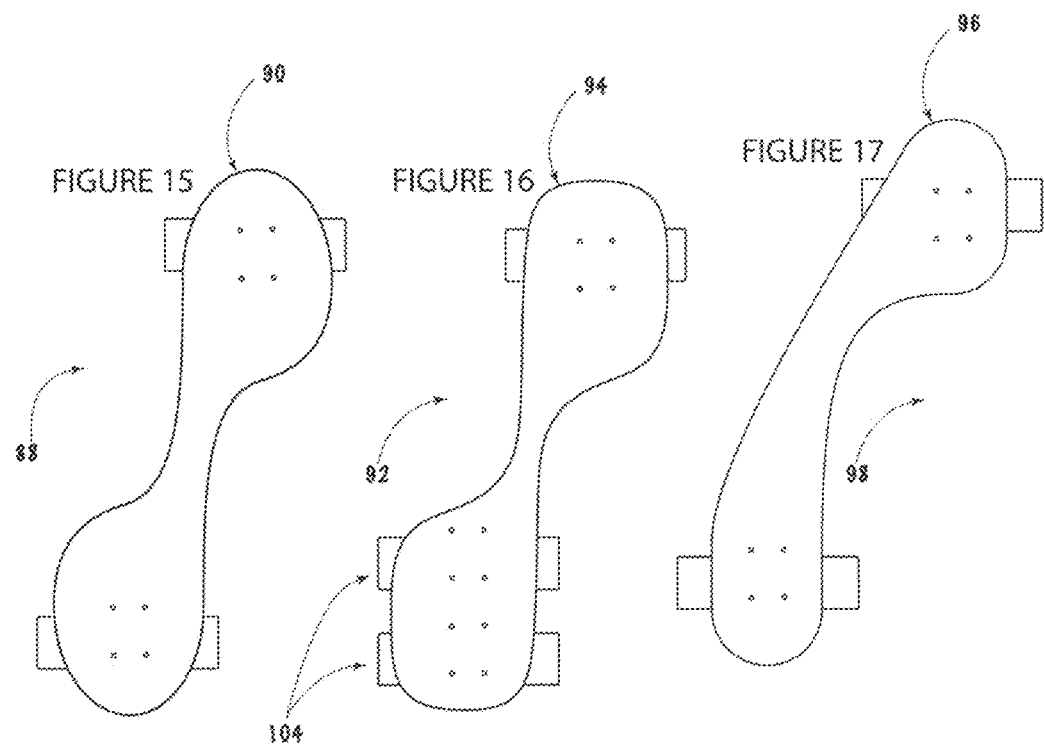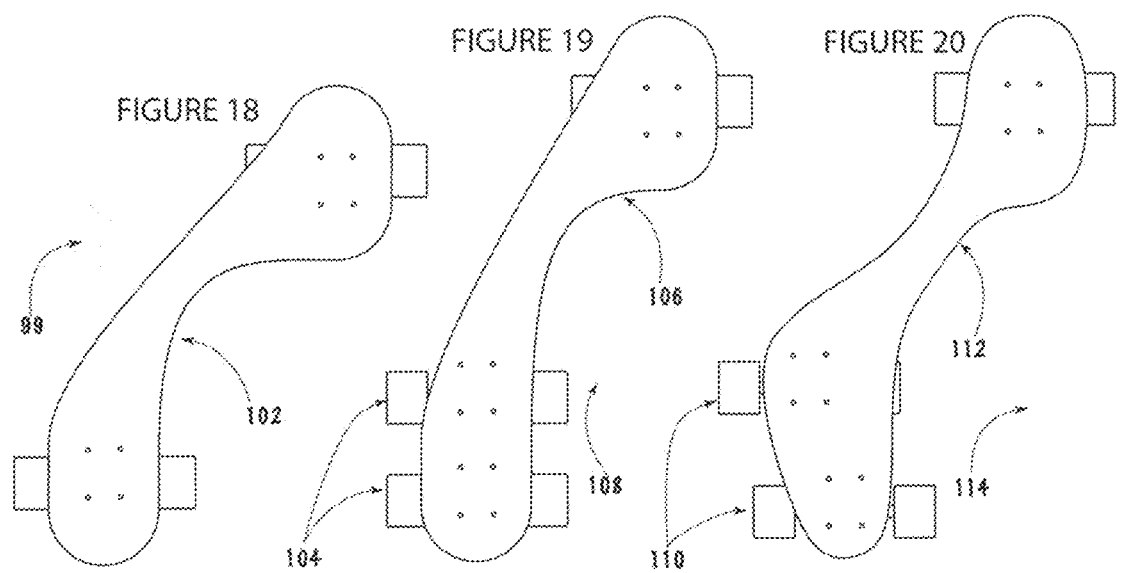

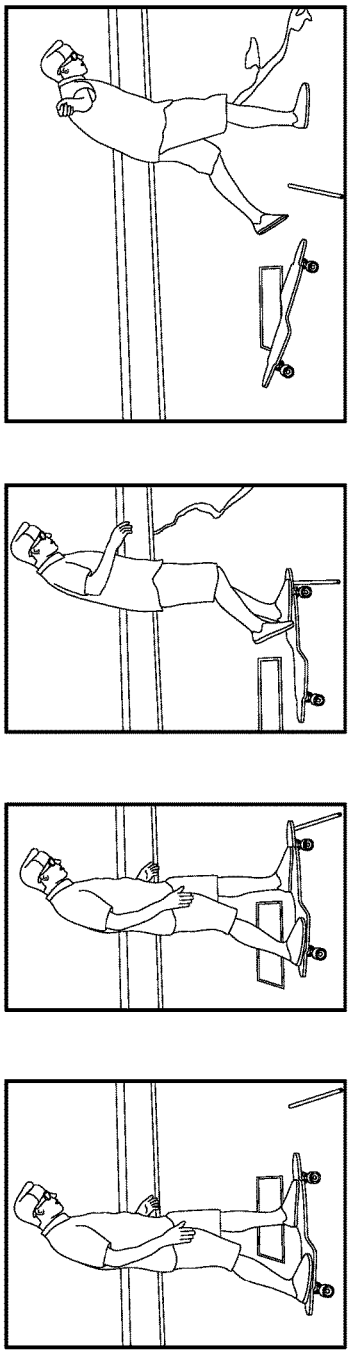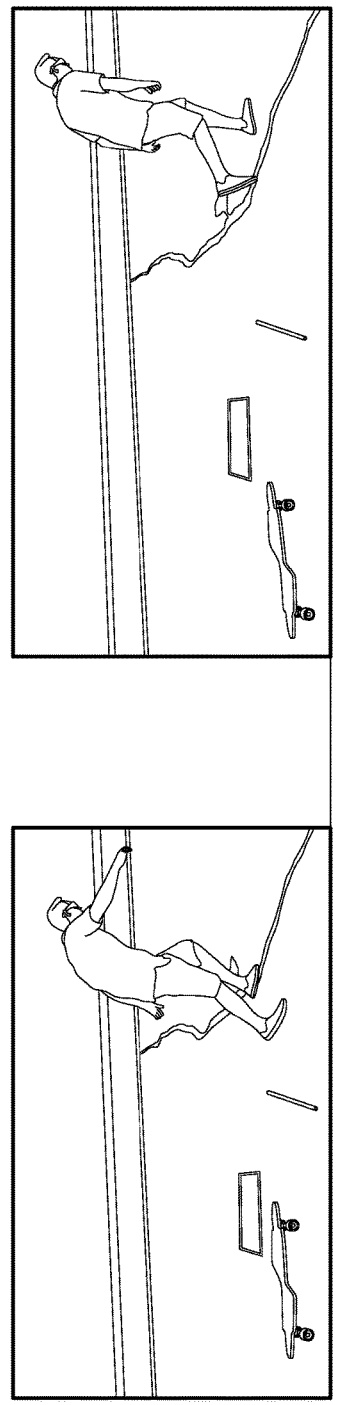

SKATEBOARD WITH LATERAL WHEEL POSITION

This application claims the benefit of prior filed provisional application, Ser. No. 62/371,263, filed Aug. 5, 2016.

FIELD OF THE INVENTION

The present invention generally relates to the field of wheeled amusement and standing riding devices. Specifically, the invention relates to a skateboard having wheel sets at each end of the board, wherein the wheelsets are attached so as to create a lateral offset of the wheels, or a diagonal orientation of the board, with respect to forward movement of the board over an underlying surface.

BACKGROUND OF THE INVENTION

There exists a number of solutions for standing riding devices or skateboards. The common skateboard has evolved over the years into various lengths, widths, suspension types, wheel types and tracks, some equipped with caster wheels and steered wheels and some, even, motorized. The boards are flexible to a varying degree and have performance characteristics suited to the intended use, i.e., tricks, high (relative speeds), commuting, motorized (electric or IC engine), off-road, etc. Some of these solutions attempt to provide an acceptably safe way for riding, but these solutions fail to meet the needs of the industry because they are inherently unsafe owing to the skill set necessary to become a successful rider. Safety, instead, is provided by helmets, knee and elbow pads, etc.

In addition to the foregoing riding challenges, solutions to provide ways to carry a skateboard-like or scooter-like board easily are hard to find; these solutions are generally unable to meet the needs of the users because they have not made the carrying position anything other than grabbing the board, somewhere along its length, and proceeding. In addition, some on-board maneuvers require solutions to give better ergonomic options for holding the board during tricks, but these solutions also fail to meet user needs because of the general non-ergonomic methods, i.e., a full-crouch, necessary to grasp the board.

SUMMARY OF THE INVENTION

It would be desirable to have a board design that allows a rider to ride a standing riding device with wheels disposed (diagonally) and laterally with one foot forward relative to the other in a natural standing or stability posture and foot position. Such a design would enable riders of all skill levels more stability, flexibility and safety than any other human-powered or motorized rolling device used.

It would also be useful to have a board design that provides ways to carry a riding board more easily. Still further, it would be desirable to have a design to create and perform tricks easily by providing a more ergonomic option. Therefore, there currently exists a need in the industry for a composition that makes riding safer, easier and more fun to ride.

The present invention advantageously fills the aforementioned deficiencies by providing a riding device with laterally disposed wheels on the bottom of the board and similarly disposed foot positions on the top of the board, that allows riders of all skill levels more safety, stability, ease and fun than other human-powered or motorized rolling devices currently used. While standing in a relatively forward position with one foot forward, feet approximately shoulder width apart, (as it is with a person's legs positioned in a stable walking position).

The present invention is a standing human propelled, or optionally motorized, forward riding device, which is made up of the following components: A. Board to stand on. B. Laterally and diagonally disposed wheels with axles, mounted to "trucks" (trucks are standard devices that allow riders to turn the direction of the board when moving because of the angle they pivot/rotate on, to create dual wheel pivots for turning), or without trucks optionally, or with caster wheels. C. Center handle design options for carrying the board device and for enhanced trick performance. D. Optional Paddle Pole (adjustable height) for propelling the board E. Optional Steering Handle (adjustable height) disposed onto the side of the board at the front end (as similar to a Scooter, but connected on the side of the board). F. A Remote to control a motorized version of the Board.

These components are conventionally connected as follows: A. The Board is connected to the "Trucks" or wheel mounts via bolts and nuts. B. The Trucks are connected to the Wheels (with incorporated axles) via bolts and nuts. The laterally disposed Wheels are connected to the Axle on the Trucks. C. The center handle section options connect the two foot pads of the board together. D. The optional paddle pole is separate and held in the hands. E. The optional steering handle can be attached to top of the board on the front leading end. F. The remote control for a motorized (electric or gas) version would not be connected to the board, but held in the hand of the rider.

The present invention has a unique wider offset stance when compared to other standing riding devices. This makes the device safer, and easier to learn and more fun to ride and perform tricks than other forward riding invention.

The device has many options of ways to make and ride the device. Rather than being one shape and one riding direction, this board has the unique ability to be ridden in multiple ways with the one device. The board can be flipped over to change the foot position of the riders to make it more comfortable to ride and propel the rider. Whether you ride with a "regular" style stance or a "goofy" style stance, you can use the same board by taking the wheels off and flipping the board over, then when you place the wheels back onto the flip side of the board, you have created the opposite riding style. (Regular stance to goofy stance or goofy stance to regular stance.)

This device can also be ridden in multiple directions, since it can be designed and set up to ride in either direction, because the board and wheels are designed in a symmetrically and diagonally offset way. Multiple versions of wheel set-ups are also available. Two sets of wheels with trucks are standard. However, 3 sets of 2 wheels are also an option to give the rider a more stable first foot position. If one chooses to change the diameter of the wheels or add gap spacers to the middle set of "trucks" the ride can have some additional opportunities for spins and other difficult maneuvers than on standard skateboard-like boards. If one chooses to utilize the optional scooter-like handle on the front of the board, then single, or caster style, wheels are an option to use as well.

Multiple materials, and combinations thereof, can be used to create the board: plastic, metal, rubber to wood.

The method of use associated with the present invention may also include one or more of the following steps: 1. Put your first foot on the back end of the Board. (This can be either the right or left foot depending on the stance desired and therefore the setup of the board). 2. Then the user can use their other foot to push and propel the person riding the device in the general direction of travel desired. 3. Once the rider has started to travel in the desired direction, then they can lift the pushing foot up to the front pad to rest it during their ride. 4. And then the rider has the option of leaning on the board with the pressure of their feet, in the desired direction to turn the wheels to guide the board's direction of travel. By changing the boards types of wheels, position, width, length or shapes, one can customize the riders' experiences on the boards. 5. If the board is propelled with a paddle pole, then one places their feet on the board and uses the paddle pole to propel oneself with a downward side movement on the ground beside the rider. Because of the unique offset forward riding stance, one can have even more stability when employing this method of propulsion. 6. If one chooses to utilize the optional scooter-like handle, one will have even more stability to ride and steer the riding device.

The present invention device is superior when compared with other known riding boards with wheels, because the present invention provides: 1) A safer more natural human ergonomic dismount system to prevent many injuries that often happen because of the sideways riding stance with other boards. 2) A more stable foot position that allows the rider to face in a generally forward direction for more general stability, like the feet position of natural walking when taking a step. One foot forward and approximately shoulder with apart. 3) An easier board to learn to ride because of the natural inherent stability of the foot positions of this unique riding device. 4) An easier board to change from goofy to regular riding stances easily, by flipping the wheels and trucks to the other side of the board. 5) An easier board to ride in multi-directions, given its laterally and diagonally offset symmetrical shapes available. 6) An easy board to change the position of the wheels and trucks (ordinary or caster type) with multiple optional holes available to adjust the wheel positions for a variety of rider personalizations. 7) A center holding handle integrated at the center of the board that provides an easier (more ergonomic) way to hold the board for performing unique tricks, jumps and maneuvers. This handle also makes it easy to carry the device, when not riding it. 8) Optional propelling methods including: Pushed or propelled with the foot of rider, motorized, or pushed or propelled with a paddle pole. 9) Optional Steering Handle disposed onto and connected to the side of the board at the front top of the board (adjustable size height to fit each rider) to add another stabilizing option for new riders, and to provide additional trick riding for advanced riders.

Among other things, it is an object of the present invention to provide a device with laterally and diagonally disposed wheels, that allows riders of all skill levels more stability, flexibility and safety than any other human-powered or motorized rolling devices used, while standing in a relatively forward position with one foot forward, and approximately shoulder width apart, as it is with a user's legs positioned in a stable walking position.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 1 shows a perspective view of a skateboard in accord with the present invention.
FIG. 2 shows a bottom view of the skateboard in FIG. 1.
FIG. 3 shows a side view of the skateboard in FIG. 1.
FIG. 4 shows a top view of the skateboard in FIG. 1.
FIG. 5 shows a top view of the skateboard in FIG. 1 including a user's feet.
FIG. 6 shows an end view of the skateboard in FIG. 1.
FIG. 10 shows a top view of the skateboard in FIG. 8 including a user's feet in a riding position.
FIG. 11 shows a top view of the skateboard in FIG. 8 including a user's feet in an alternative riding position.
FIG. 12 shows a top view of the skateboard in FIG. 8 including a user's feet in another alternative riding position.
FIG. 13 shows a top view of the skateboard including multiple mounting hole variations for wheel trucks.
FIG. 14 shows a bottom view of the skateboard including multiple mounting hole variations for wheel trucks.
FIG. 15 shows a top view of a skateboard including two-wheel trucks and a right foot enhanced clearance shape.
FIG. 16 shows a top view of a skateboard of FIG. 15 including a pair of rear mounted wheel trucks.
FIG. 17 shows a top view of the skateboard including a wider lateral offset and a left foot clearance shape.
FIG. 18 shows a top view of the skateboard including an even wider lateral offset and a left foot clearance shape
FIG. 19 shows a top view of the skateboard including a wider lateral offset and a left foot clearance shape and two rearward wheel trucks
FIG. 20 shows a top view of the skateboard including a wider lateral offset and two rearward wheel trucks, one offset from the other.

FIGS. 35-50 show a user pushing off, mounting, riding, and rapidly dis-mounting a skateboard according to the present invention.

DETAILED DESCRIPTION OF THE PREFERRED EMBODIMENTS

Figure 7:
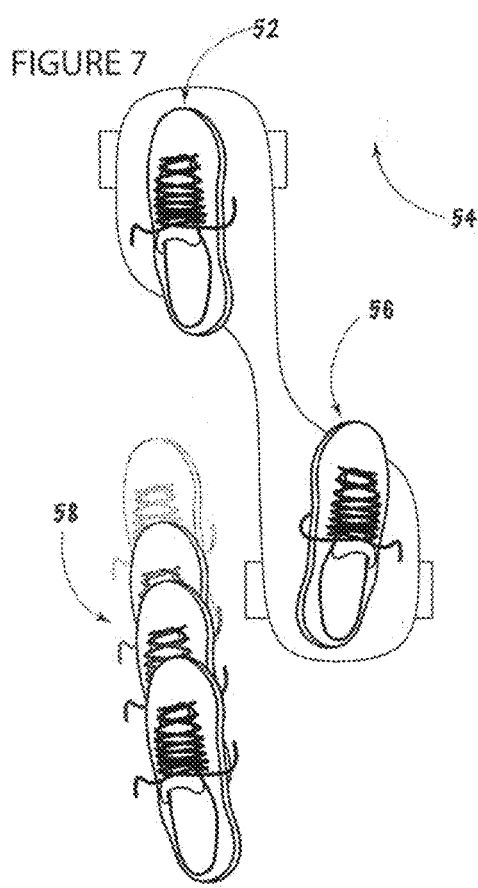
FIG. 7 shows a top view of the skateboard in FIG. 1 including a user's feet in motion.

A device in accord with the present invention is a skateboard with laterally and diagonally disposed wheels, that allows riders of all skill levels more stability, flexibility and safety than other human-powered or motorized rolling devices used, while standing, in a relatively forward position with one foot forward, and approximately shoulder width apart, as it is with a person's legs positioned in a stable walking position.

In its most complete form, the present invention device is made up of the following components: A. A board element designed with a variety of shapes that provide stability and ease of use. B. Attached wheel trucks, equipped with suspensions, axles, and wheels of many shapes widths and sizes. C. Optional Center Handle sections that are ergonomically easy to grab with one's hand or carry with one's hand. This can be provided by way of a thinner center section in the middle of the board or a double arc handle section with a centralized hole large enough to place four fingers through. The thumb would wrap naturally around the top of the handle to give the opposing pressure to maintain grip. These handles can also be used to allow the rider the ability to hold the board for tricks, jumps or other maneuvers. The latter option adds additional supportive ergonomics, since the handle is raised up higher which in turn makes reaching down or bending your body to reach for the handle a much easier method to grab the handle. D. Optional scooter-like steering handle which is disposed or connected on the top side of the board which still allows the rider to enjoy riding Regular or Goofy style (adjustable handle height is easily changed, depending on the size of the rider). The additional pleasure of secure comfortable riding by utilizing the ergonomics of holding a tall scooter-like steering handle with feet placed in a natural stable side-by-side standing walking position with laterally and diagonally disposed wheels positioned wheels beneath the board is a nice fun option to employ. The ability to turn the board with a tall handle adds a distinctly unique way to direct this unique board. By leaning and twisting the board, with the handle or moving the board with weight shifting, the standard wheels and trucks can be utilized to turn the scooter's direction of travel. This board has additional options of board designs because of the ability to employ double or single wheels. This increases options to optimize turning methods. One is with standard double wheels and trucks. It can also utilize more traditional single wheels as seen on standard scooters/boards, whereby the handle can be designed to rotate to actually turn a single front wheel, as with other scooters on the market. In this invention, with wheels and feet disposed in a generally lateral feet side-by-side position, with one foot in front of the other and not in a straight line, the sensation and control is different from known skateboards. By doing this one adds stability and comfort, because you can now allow feet to be placed back onto the board naturally, in a side-by-side walking position, after pushing off or propelling oneself with the free forward foot. Another option is to continue to utilize the standard two-wheel trucks and axles on the rear of the board in the new novel design configuration.

FIG. 1 shows a particular version of a forward riding skateboard device. In this particular embodiment, the forward riding device is shown with an optional center handle 16 and 8, which is shown here. It also is shown as having two sets of wheels 6 and 10 and two foot platforms 14. The two platforms 14 and 2, one on either side of the board, top and bottom, front and back, are optionally symmetrical, if desired, are connected by a center section or an optional handle. Instead of the standard holes 4, for attaching the wheels and trucks to the board, the board can be designed with multiple holes that allow for changes of positions to attach the wheels to the board. This gives one the variety of styles to ride with one board. In still a further version, the foot pads can be outfitted with rubber footpads, sandpaper-like coating or other high friction features giving one better slip-free riding.

FIG. 2 shows the bottom view of a particular version of a forward riding device. The wheels 28, which are attached to the board 22, via the trucks 18 and 20, can be attached to the board via the holes on the board 26. The center section of the board 24, will be strong enough to not break during normal or extreme riding sessions by being designed as either a double looped handle or a thicker board thickness, or made with carbon fiber or could be injection molded with fiberglass reinforced plastic.

FIG. 3 shows the side view of a particular version of a forward riding device. The optional handle 40, is attached between the two foot pads 34 and 36. The trucks 38 can be attached to either side of the board, top or bottom, depending on the riding stance desired, regular or goofy. An optional embodiment of the forward riding device is shown with upward arced ends on the board 32 that are useful to help ride and steer the board.

FIG. 4 shows the top side of the board 44 with optional grip designs, and the thinner center sections that open up the positions off to the sides of the center section 42 to allow the foot that is free to take advantage of the free space to push off and propel the board when riding.

FIG. 5 shows the general foot positions for riding that allow for a forward stance. Other positions are optional.

FIG. 6 shows the end view of a particular version of a forward riding device. This particular version shows the approximate handle height 50 and the optional gap created 30, that gives additional options for steering the board with the foot and also gives an opportunity for LED lights 52.

FIG. 7 shows the general foot positions 52 and 56 that allow for the front foot 52, to be lifted off the front of the board to press the foot down and propel the board forward on the concrete, asphalt or similar surface with a sweeping push 58 to go in a forward direction 54. Riding with the left foot forward is known as riding in "Regular Stance" position. The board will be oriented with the back part of the board offset diagonally and to the lower right.

Figure 8:
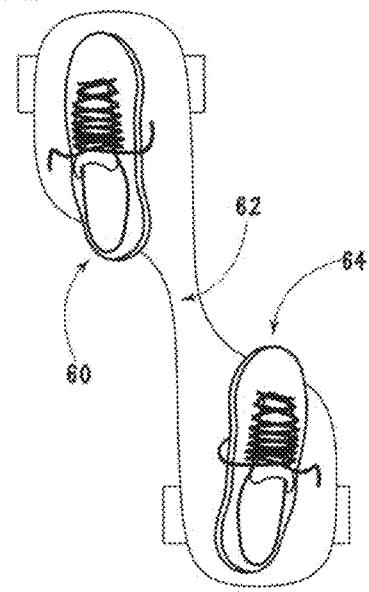
FIG. 8 shows a top view of the skateboard in FIG. 1 including a user's feet in position for riding.

FIG. 8 shows the general foot positions used to steer the board. To turn left a rider will lean left and press down on the heel of the left foot 60. To turn right the person will lean right and push down on the front of the right foot (toe area)

64. Some boards will have the option to lean the board to slightly twist the center section located between the two foot pads.

Figure 9:
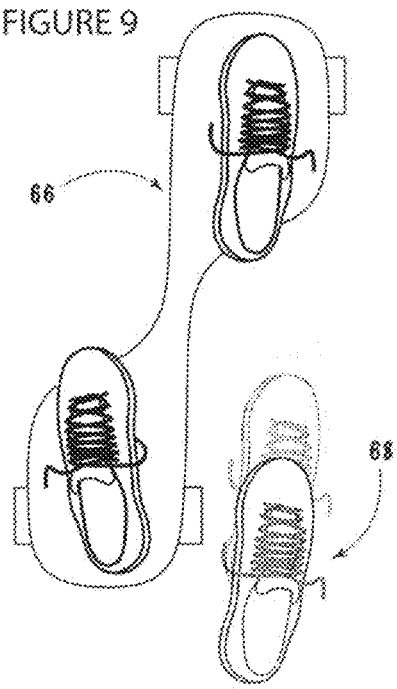
FIG. 9 shows a top view of the skateboard including a user's feet in an alternative riding position on a design variation of the present invention.

FIG. 9 shows the general foot positions used to ride the board in a "Goofy style" riding position, with the left foot back. The board 66 will be oriented with the back part of the board offset diagonally and to the lower left.

FIG. 10 shows the standard position for your feet 70 and 72 when riding this board. It makes stepping off the board during pushing or hitting an obstacle the easiest and safest to navigate.

FIG. 11 shows the slightly turned foot position on the top of the board 74 and 76. This position is an option to get a little easier turning or steering the board during the ride and it still makes it safe to launch off the front of the board when you hit an obstacle that stops the board during a ride.

FIG. 12 shows the feet positioned in a more sideways position during a ride 78 and 80. While these feet positions allows a rider that has been formerly trained on standard skateboards more sense of similarity to what they are used to, it tends to reduce the ability to safely step off the front of the board during an unexpected fall. It is still safer than two feet on a standard board in perfect alignment with the direction of travel. It also makes the pushing off with the forward foot the gain speed a little more difficult. However, one may choose to twist their feet positions during a ride to have a variety of foot positions to accommodate riding styles or to optimize tricks.

FIG. 13 shows the bolts 82 and the various holes positions 84 on the top of the board, that are available to attach the trucks and wheels to the board. These different hole positions allow the riders to customize their ride to their desires.

FIG. 14 shows the various positions available to attach the trucks and wheels to the bottom of the board 86. These different hole positions allow the riders to customize their ride to their desires. Wider or narrower wheel positions are advantageous for different size people or unique rider needs. Longer or shorter wheel positions are also advantageous to control riding styles and to maximize tricks on one board with various positions available.

FIG. 15 shows one design shape of the present invention. It has a generally symmetrical perimeter profile with laterally and diagonally offset wheel bases 90. This design option allows one to ride the board both regular and goofy (by attaching the wheels to the desired side of the board) as well as to ride multi-directional 88.

FIG. 16 shows another design shape of the present invention. It has a generally symmetrical perimeter profile with laterally and diagonally offset wheel bases 94. This design option allows one to ride the board both regular and goofy (by attaching the wheels to the desired side of the board) as well as to ride multi-directional 92. It also allows one the option to attach more than one set of trucks and wheels under one foot position to add stability to one or both feet 94. This gives the rider the ability to gain stability during the training period. When it is set up for a goofy riding stance 94, then the double trucks help stabilize the back left foot when starting off the ride and therefore typically used for more uni-directional riding 92. However, as this invention is ridden, it is intentionally designed to allow for freedom of riding styles, options and creativity, because of the options that are built into the design allowing various set-ups. This design lends itself to uni-directional riding 92, but can be ridden in either direction.

FIG. 17 shows the present invention set up with a non-symmetrical perimeter design 96. This is a variation of the present invention. It is designed to maximize the ability to get a longer push off area beside the board to gain more push and speed during the ride. By having more open space to push off to the right or left of the board, one can propel oneself faster. This design lends itself to uni-directional riding 98, but can be ridden in either direction.

FIG. 18 shows the present invention set up with a non-symmetrical perimeter design 102. This is a variation of the present invention. It is designed to maximize the ability to get a wider stance to give more stability. This design lends itself to uni-directional riding 99, but can be ridden in either direction.

FIG. 19 shows the present invention set up with a non-symmetrical perimeter design 106. This is a variation of the present invention. It is designed to maximize the ability to get a longer push off area beside the board to gain more push and speed during the ride. Plus with double trucks and sets of wheels at the rear of the board 104, you can also gain more stability 106. This design lends itself to uni-directional riding 108, but can be ridden in either direction.

FIG. 20 shows the present invention set up with a non-symmetrical perimeter design 112. This is a variation of the present invention. It is designed to maximize the ability to get a longer push off area beside the board to gain more push and speed during the ride. Plus, with double trucks and sets of wheels at the rear of the board 112, you can gain more stability 106. This design lends itself to uni-directional riding 114, but can be ridden in either direction. The option on this variation of the board 112, is to offset the double set of wheels and trucks that are under the back foot 112, to add another creative option that would be available to the rider. This is done to maximize the stability of the rider even more than when the trucks are lined up.

Figure 21:
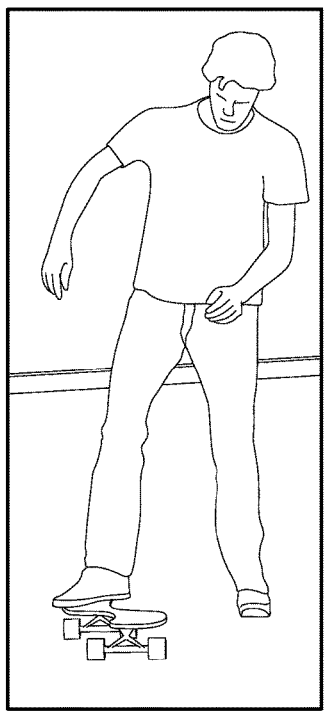
FIG. 21 shows a person pushing off on a skateboard according to the present invention.

FIG. 21 shows the board being ridden in a regular stance style. With the right foot on the right rear foot pad, the left foot is free to push off the ground. Illustration is a front view position.

Figure 22:
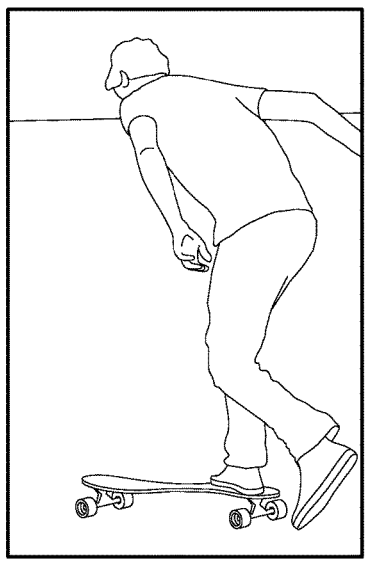
FIG. 22 shows a person mounting a skateboard according to the present invention.

FIG. 22 shows the board being ridden in a regular stance style. With the right foot on the right rear foot pad, the left foot is free to push off the ground. Illustration is a left side view position.

Figure 23:
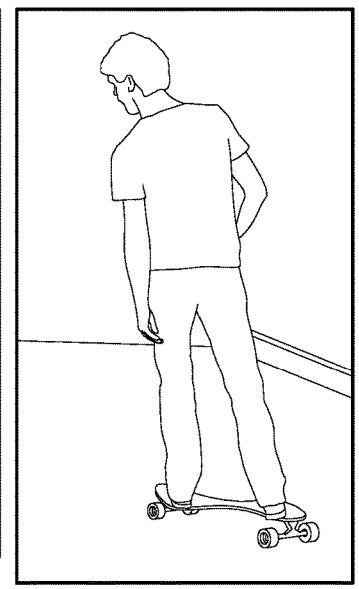
FIG. 23 shows a person riding a skateboard according to the present invention.

FIG. 23 shows the board being ridden in a regular stance style. With the right foot on the right rear foot pad, the left foot is resting on the front left foot pad. Illustration is shown from a right rear-view position. The rider is leaning to the left and pressing down on his left heel to turn the board to the left.

Figure 24:
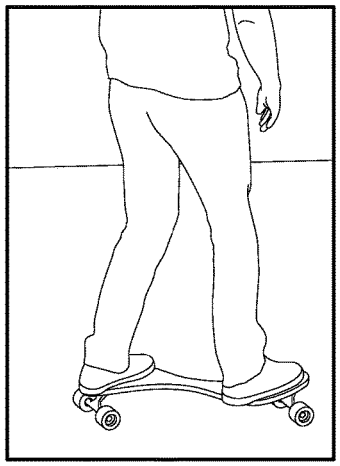
FIG. 24 shows a person riding on an alternative skateboard according to the present invention.

FIG. 24 shows the board being ridden in a goofy stance style. With the right foot on the right front foot pad, the left foot is resting on the front left foot pad. Illustration is shown from a right-side view position.

Figure 25:
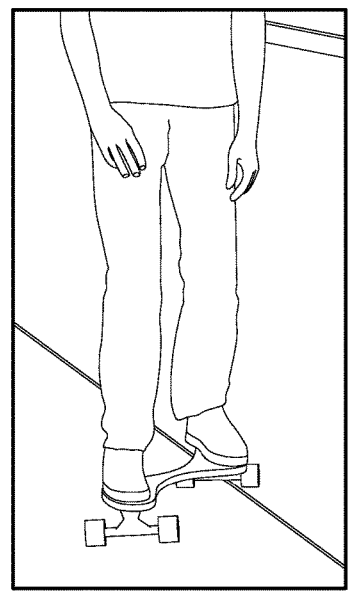
FIG. 25 shows a person riding on an alternative skateboard according to the present invention.

FIG. 25 shows the board being ridden in a goofy stance style. With the right foot on the right front foot pad, the left foot is resting on the front left foot pad. Illustration is shown from a front view position. This view accentuates the offset stable position of the rider while riding.

Figure 26:
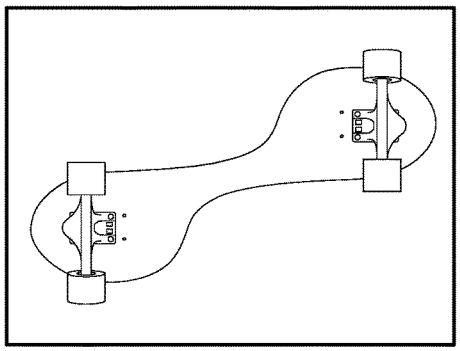
FIG. 26 shows a bottom view of a skateboard in accord with the present design.

FIG. 26 shows a variation of the present invention made from plywood, from the bottom side view. Note graphics are on the top and bottom of the board. Each side has clear sand grit applied to the surface as an option to create better grip with shoes when riding on either side, whether set up for regular or goofy riding stance.

Figure 27:
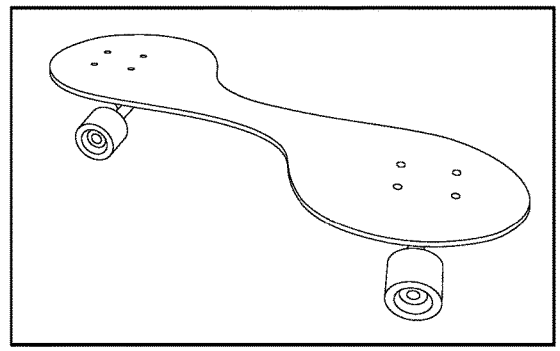
FIG. 27 shows a forward view of a skateboard in accord with the present design.

FIG. 27 shows a variation of the present invention made from plywood, from the right or left side view. Note graphics are on the top and bottom of the board. Each side has clear sand grit applied to the surface as an option to create better grip with shoes when riding on either side, whether set up for regular or goofy riding stance.

Figure 28:
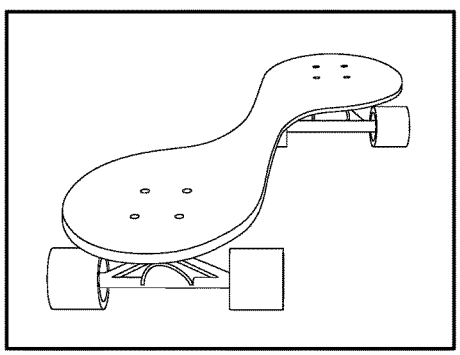
FIG. 28 shows a rear three quarter view of a skateboard in accord with the present design.

FIG. 28 shows a variation of the present invention made from plywood, from the rear or front-end view. Note graphics are on the top and bottom of the board. Each side has clear sand grit applied to the surface as an option to create better grip with shoes when riding on either side, whether set up for regular or goofy riding stance.

Figure 29:
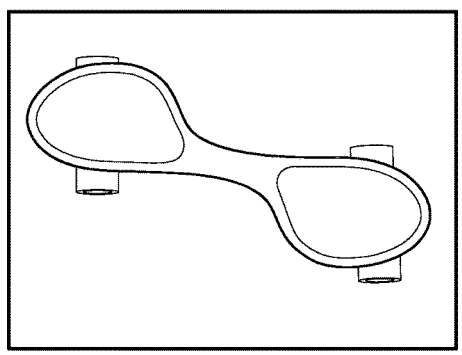
FIG. 29 shows a top view of a skateboard in accord with the present design with foot pads.

FIG. 29 shows a variation of the present invention made from injection molded translucent plastic and over-molded with a TPR or EVA rubber-like material designed for grip on the top and bottom of the board. Shown from a front top left view.

Figure 30:
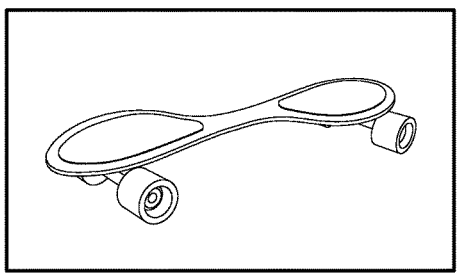
FIG. 30 shows a perspective view of a skateboard in accord with the present design with foot pads.

FIG. 30 shows a variation of the present invention made from injection molded translucent plastic and over-molded with a TPR or EVA rubber-like material designed for grip on the top and bottom of the board. Shown from a low top view.

Figure 31:
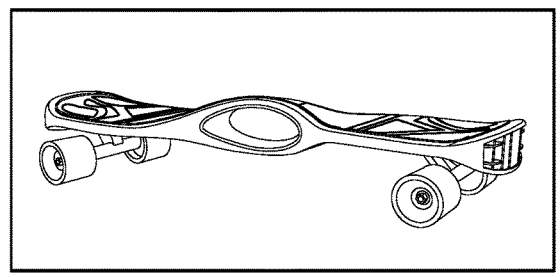
FIG. 31 shows a three-quarter rear view of a skateboard in accord with the present design with a handle.

FIG. 31 shows a variation of the present invention made from injection molded opaque and translucent plastic and over-molded with a TPR or a rubber-like material designed for grip on the top and bottom of the board. Shown from a side view. Also shown in this particular design option of the present invention is a version with a molded center handle section and molded kick plates on the ends of the board.

Figure 32:
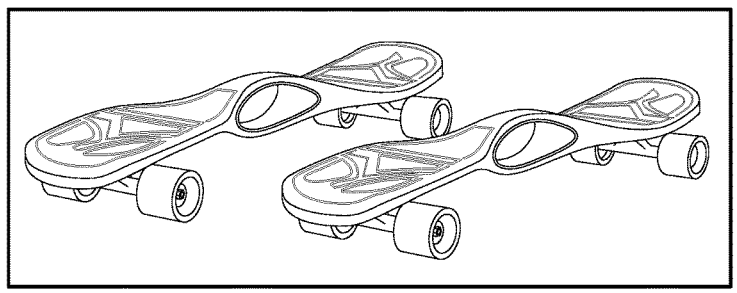
FIG. 32 shows a three-quarter front view of a skateboards in accord with the present design with handles.

FIG. 32 shows a variation of the present invention made from injection molded opaque and translucent plastic and over-molded with a TPR or a rubber-like material designed for grip on the top and bottom of the board. Shown from a side view. Also shown in this particular design option of the present invention is a version with a molded center handle section and molded kick plates on the ends of the board.

Figure 33:
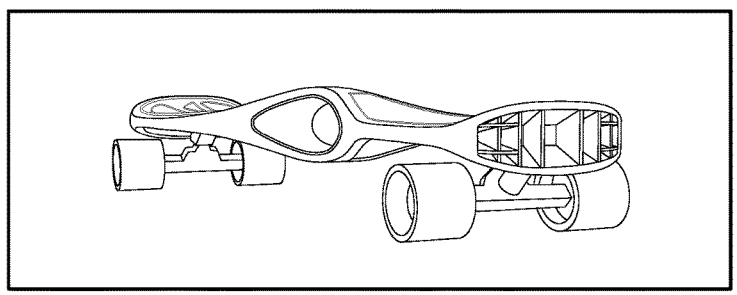
FIG. 33 shows a three-quarter end view of a skateboard in accord with the present design with a handle.

FIG. 33 shows a variation of the present invention made from injection molded opaque and translucent plastic and over-molded with a TPR or a rubber-like material designed for grip on the top and bottom of the board. Shown from a side view. Also shown in this particular design option of the present invention is a version with a molded center handle section and molded kick plates on the ends of the board. Note this board design has an option for LED lighting imbedded into the board.

Figure 34:
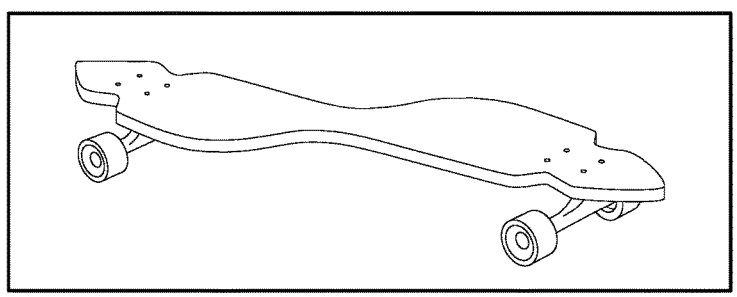
FIG. 34 shows a plywood version of a skateboard in accord with the present invention.

FIG. 34 shows a variation of the present invention made from plywood, from the top front side view. It is set up for a regular riding stance The most complete form of performing the method associated with the present invention device consists of the following steps:

1. Person wears the standard safety equipment, (elbow, wrist and knee pads, plus an approved impact safety helmet) with standard rubber sole tennis shoes preferably, so they can stand on the board and not slip off and to mitigate personal harm, if in unavoidable crashes.

2. Person places their desired foot on the back pad of the board facing forward, (left or right foot is depending on your preferred riding stance).

3. Then the other foot is used to push or propel oneself in the desired direction of travel. (If board is mechanized with a motor, then both feet can go on at any time, facing forward.

4. Once the desired forward speed has been achieved, the rider can lift their side pushing foot up to a resting position onto the front pad. Once your feet are in their standard walking style forward pointing position, they can stay there. Your feet positions do not need to be rotated, as in other boards, to get your body sideways and to get both feet on the boards. You will, instead, stay in a forward facing direction for the duration of your ride.

5. By applying pressure from your feet to the two pads, one can steer the board by applying pressure with each of their feet. To turn the board's forward direction (to steer it) during your ride, (if riding with your right foot forward) you will put downward pressure on your right heel to turn right, and conversely, you will put downward pressure on your left foot toes area, to turn left. If riding with feet in the other position simply reverse the direction just mentioned.

6. When the board slows down, you will naturally lift your right foot off of the front right pad and repeat the pushing or propelling motion with your right foot on the ground once or more times to get to the desired speed. Then simply return the right foot to the forward right foot pad area to rest your front foot comfortably.

7. At the conclusion of the ride, or upon hitting an unexpected obstacle, (like a rock, crack in the road or other obstacle) you will lean forward onto the right foot and naturally lifting your back (left) foot off of the board, as in a natural walking method to launch off the front of the board. The right front foot can stay on the device until the left foot is ahead of the right foot, thus allowing one to "catch" oneself, in a walking or running motion.

8. Then, as if walking or running, the right front foot will follow in front of the left foot to the ground to continue the "catching" motion. This natural dismounting system from the board keeps the rider more stable, similar to the method we all perform when walking or stepping off of an escalator or an airport people-mover or conveyer system.

9. Ultimately, at the conclusion of these steps, the rider now has the unique option to turn their body around 180 degrees and go back to the device they just left and jump back on and ride it in the opposite direction, in the same style riding stance as before, (goofy or regular stance) since the board can be designed with the standard option of laterally and diagonally disposed wheels, offset symmetrical and multi-directional shape. All of this is done without needing to lift or move the device to turn it around, as with other items.

Figure 35:
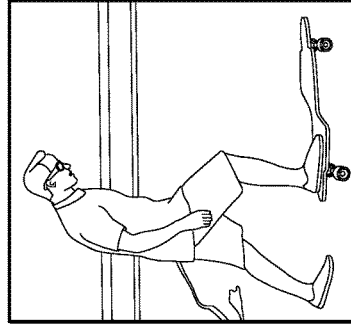

10. FIG. 35 shows a variation of the present invention made from plywood. A rider is shown starting the method of riding this design, as set forth above, of the present invention, from the right-side view. It is set up for a regular riding stance. To begin, one places the right foot on the right rear foot pad.

Figure 36:
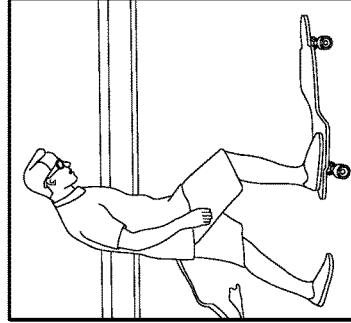

11. FIG. 36 shows the next stage of the riding method. Next one has the left foot on the ground next to the board and starts to push the board forward slowly with the left foot.

Figure 37:
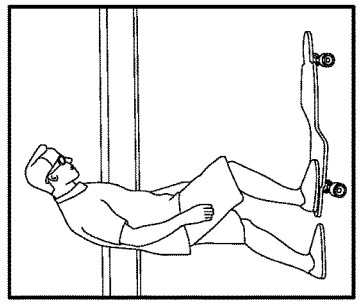
Figure 38:
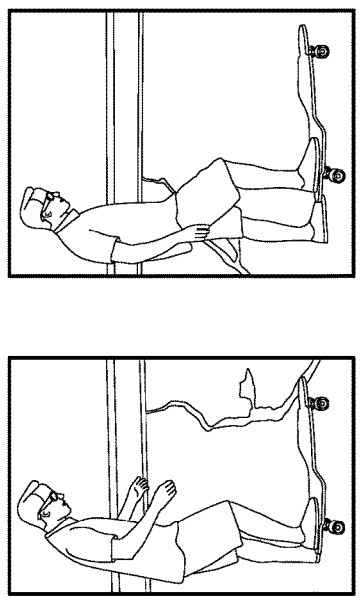
Figure 39:
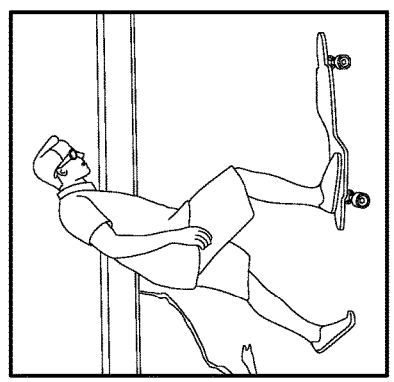

FIGS. 37, 38, and 39 shows the next stages of the riding method. With the left foot on the ground next to the side of the board with feet generally forward facing, one continues to build up speed of pushing to gain momentum and to achieve forward thrust.

Figure 40:
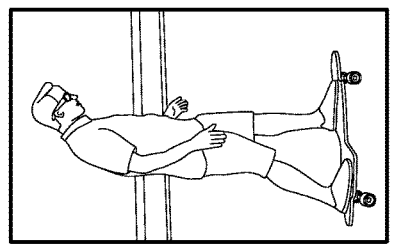
Figure 41:
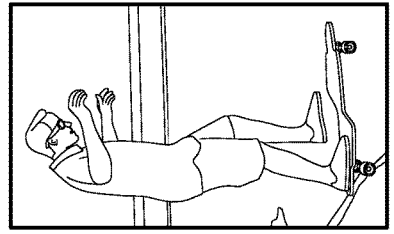
Figure 42:
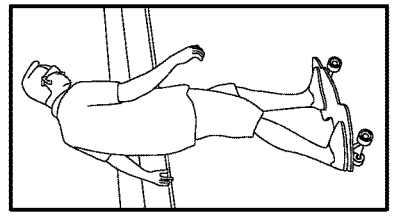
Figure 49:
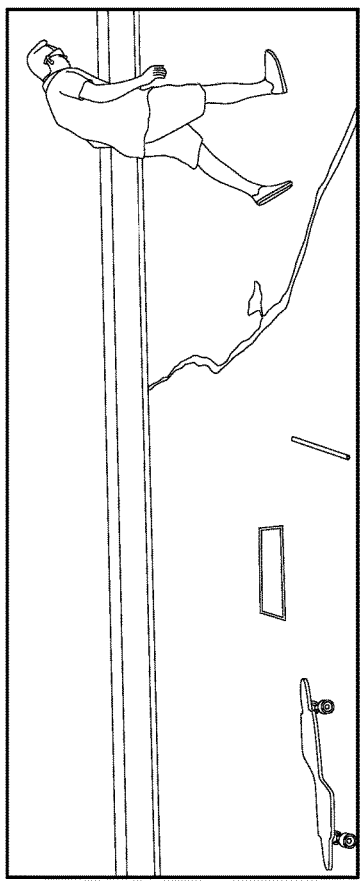
Figure 50:
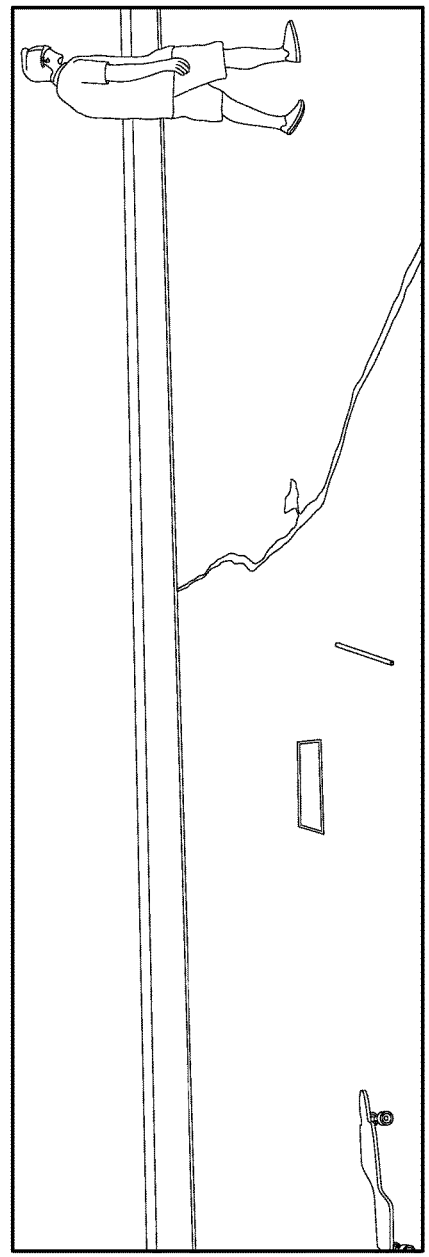
Figure 51:
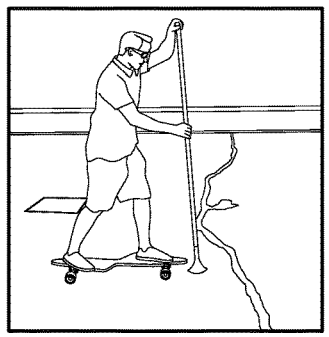
FIG. 51-59 show a user "paddling" or "poling" a skateboard in accord with the present invention.
Figure 52:
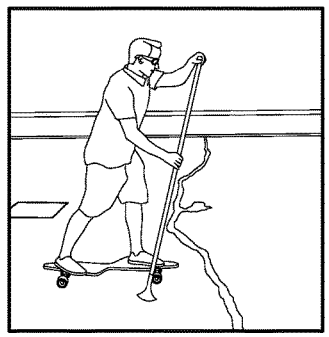
Figure 53:
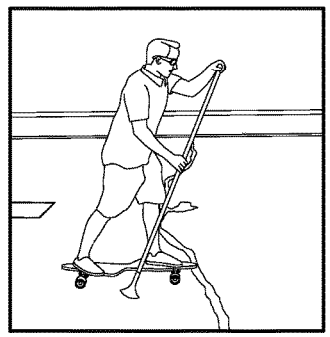
Figure 54:
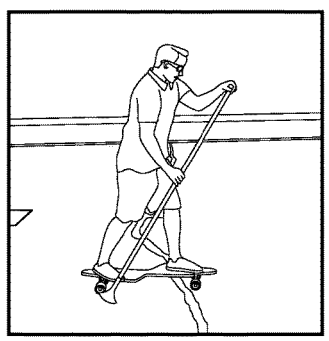
Figure 55:
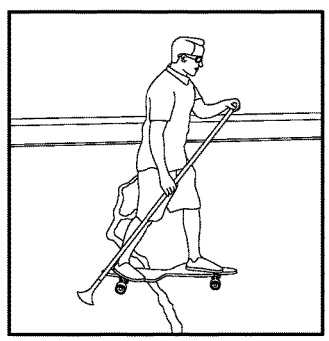
Figure 56:
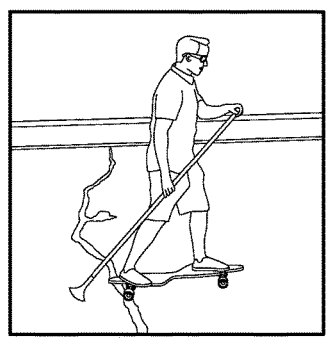
Figure 57:
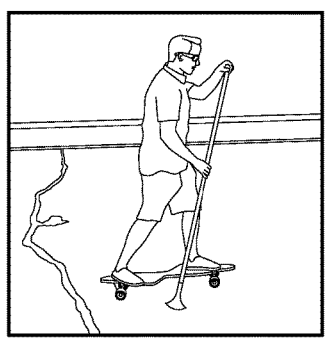
Figure 58:
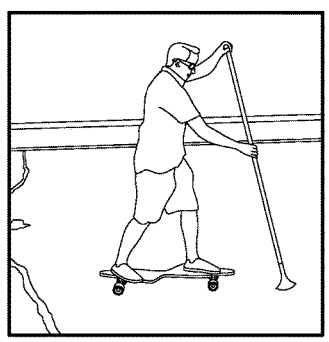
Figure 59:
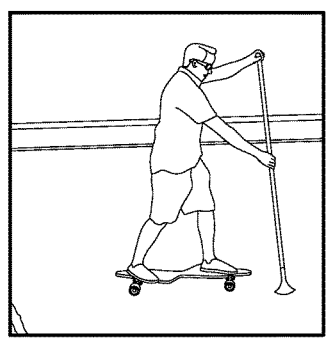

FIGS. 40, 41 and 42 shows the next stage of the riding method. Once the speed of forward motion has been achieved one lifts the left foot off of the ground and places it on the left front foot pad, to rest it and give the rider stability on the board as the rider achieves a rolling ride.

FIG. 43 through 50 shows the method which visually explains the noted safety aspect of the present invention. Once the speed of forward motion has been achieved, one may often come across an unexpected obstacle (shown here as an immovable stick on the ground in the path of the rider of the board). As you can see by the 8 steps of the incident, the rider will often have his ride interrupted by any number of obstacles and will therefore need to dismount safely. One of the features of this riding system is the safe forward dismount system. This system is one where the rider is standing in a position reflecting a walking position. This position with feet facing generally forward with one foot forward and one back approximately shoulder width apart, allows the rider traveling in a generally forward direction, the ability to fall in a forward walking or running motion with multiple steps used to catch oneself from falling. On other riding devices a sudden stop often leads to a sideways fall, whereby preventing this method of being able to catch oneself.

FIG. 51 through 59 shows the method which visually explains the optional propelling method of the present invention. By utilizing a paddle-like device, one can propel oneself easily without having to use their feet to propel the board. The paddle-like stick can be used to push the person and the board in a forward rolling direction. Steering is achieved the same way as the other method, (by pressing down on the parts of the board and leaning one can turn the direction of the forward motion.)

Figure 60:
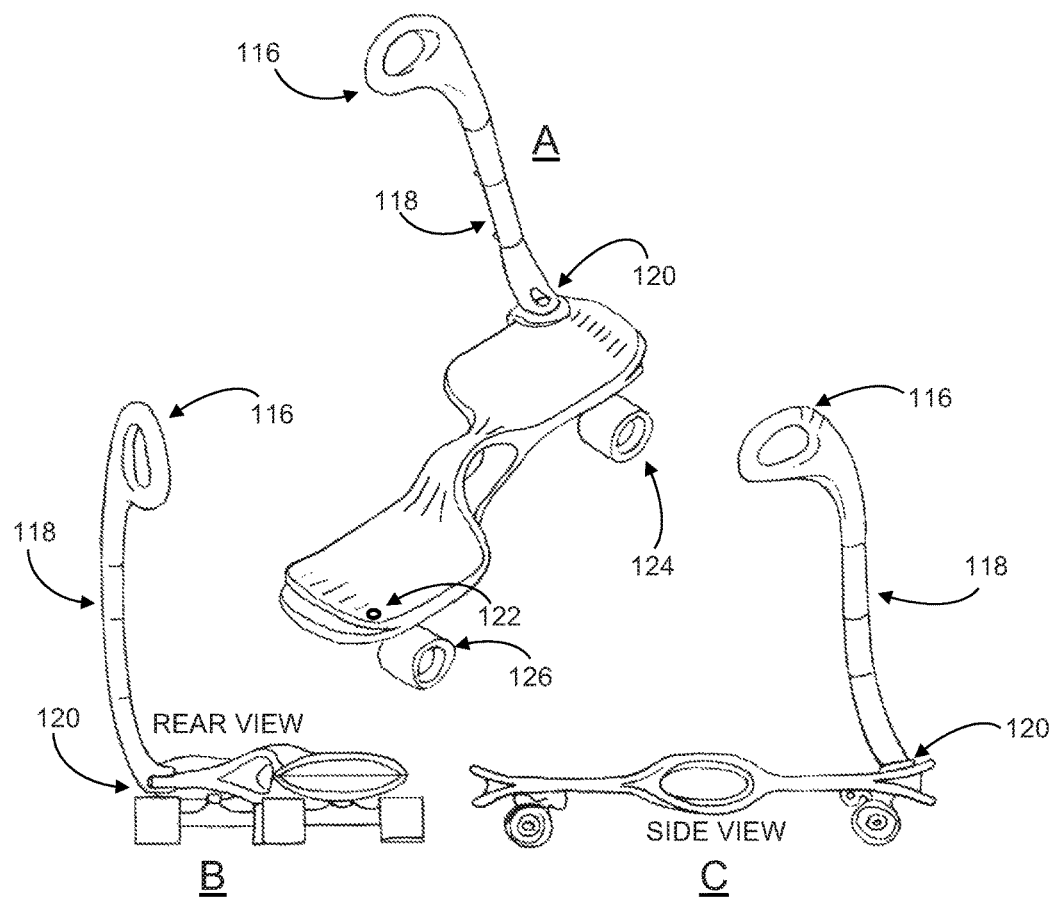
FIG. 60A, B, C show a balance handle fixture attached to a skateboard in accord with the present invention.

FIG. 60 shows a version of the present invention that incorporates a pole and a handle to assist with control, steering and stability on the board. A variety of shaped handles can be used 116. The one shown is designed to allow for a single hand to allow for turning and steering the board as it moves forward. Much like a joy stick, it is leaned in the direction of travel and it helps lean the front foot pad which in turn, move the trucks and wheels to steer the direction of this forward riding board. The long handle is adjustable 118, to fit each height of rider. The connection point of the handle 120, is able to attach to either side of the board, allowing one to ride regular or goofy styles, just by attaching the handle to the other side of the board. This board is set up on a somewhat symmetrical board. It can also be a different shape perimeter and allow the handle to also be attached to the back of the board 122. This option can make the ride different for each unique users' desires. The wheels in this particular version of the board are standard wheels and trucks used on most skateboards 224 and 126. The big advantage of this riding device is its side attached handle and its ability for the feet on the board to be placed in a diagonally offset position with one foot forward. This allows for the rider to be safer when incurring an obstacle in the road. One can simply launch off the front of the board, since the handle is offset to the side and only held by one hand. Plus the foot positions also allow for a walking or running launch off the front of the board. This will assist the riders by helping them avoid falling over the front steering handle and pole. Once they clear the side handle, then they can run or walk off to the front to naturally catch themselves.

Figure 61:
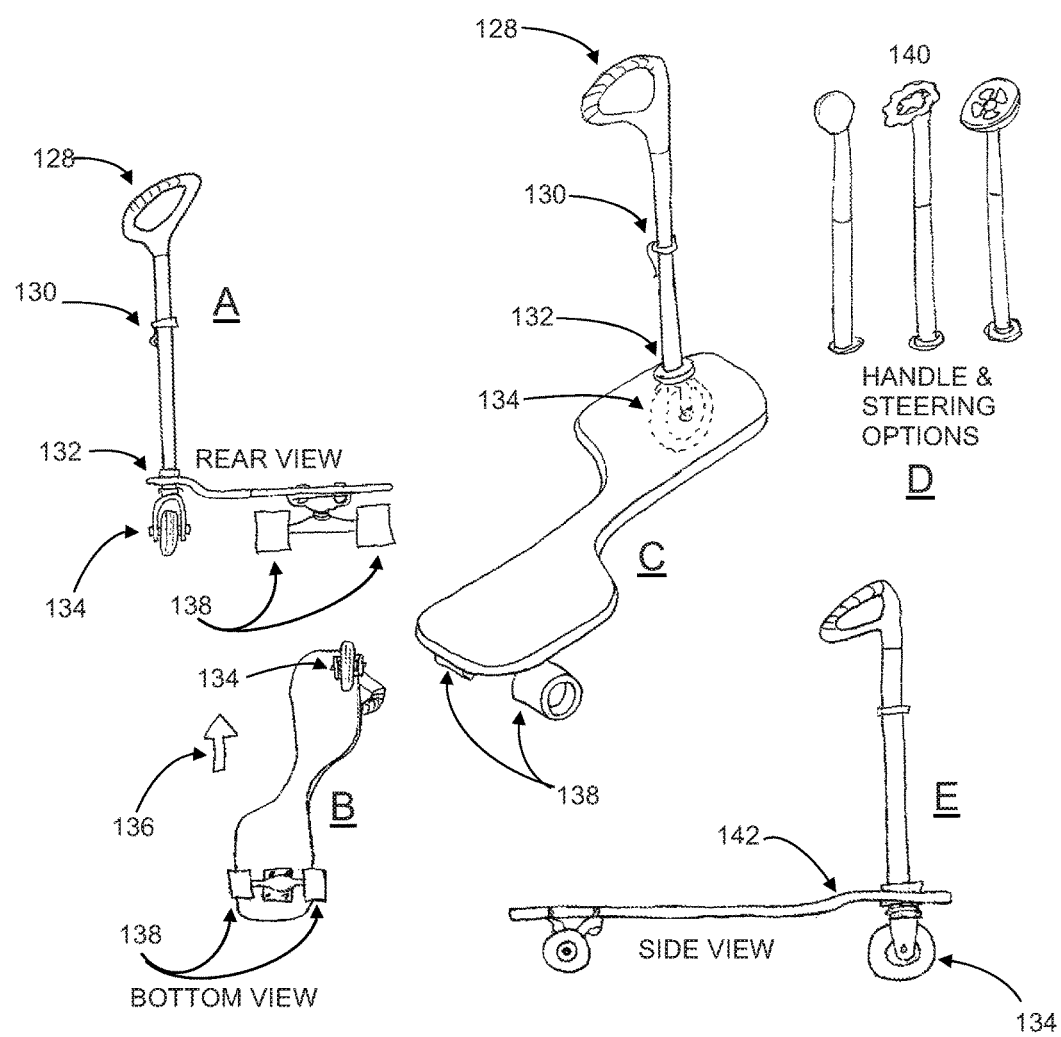
FIG. 61A-E show a steerable handle attached to a skateboard in accord with the present invention.

FIG. 61 shows a version of the present invention that incorporates a pole and a handle to assist with control, steering and stability on the board. A variety of shaped handles can be used 140. The one shown is designed to allow for a single hand to allow for turning and steering the board as it moves forward. This handle is much like a standard scooter, in that it is turned to pivot the wheel 134, below the board. By turning it in the direction of desired travel it will steer the direction of this forward riding board. The long handle is adjustable 130, to fit each height of rider. The connection point of the handle 132, is able to attach to either side of the board, allowing one to ride regular or goofy styles, just by attaching the handle to the other side of the board. This board is set up on a somewhat symmetrical board. The board can also have a variety of shapes. The board can also have a riser area 142, to allow the board to accommodate the larger wheel in the front of the board 134. The back wheels 138 in this particular version of the board are standard wheels and trucks used on most skateboards 224 and 126. This will add considerable stability to the board. But one could also attach a single wheel to the rear of the board as well. It would be good to note that a single caster style wheel on the front and rear of the board would take more time to learn to ride successfully. The big advantage of this riding device is its side attached handle and its ability for the feet on the board to be placed in a diagonally offset position with one foot forward. This allows for the rider to be safer when incurring an obstacle in the road. One can simply launch off the front of the board, since the handle is offset to the side and only held by one hand. Plus the foot positions also allow for a walking or running launch off the front of the board. This will assist the riders by helping them avoid falling over the front steering handle and pole. Once they clear the side handle, then they can run or walk off to the front to naturally catch themselves.

The invention claimed is:

1. A skateboard, comprising:
   a longitudinal board element having a first end and a second end, each disposed respectively on opposed sides of a fore and aft oriented axis of said board;
   one wheel truck mounted under each end of said board so as to suspend said board above an underlying surface and enable said board to roll, while loaded, across said surface in the direction of said axis, said board oriented diagonally across said axis with respect to its direction of travel; and,
   a looped handle positioned mid-way between said first and second end and forming a part of said board element.

2. A skateboard as in claim 1, further comprising:
   an upright yolk handle attached to a first end of said board and extending upwardly therefrom.

3. A skateboard as in claim 1, further comprising:
   footpads for engaging the feet of a user positioned on an upper side of said board at each of said first end and second end.

4. A skateboard as in claim 1, further comprising:
   a second wheel truck mounted under said second end of said board element.

5. A skateboard as in claim 1, further comprising:
   an hour glass shape for said board element, with foot positions corresponding to wide end portions of said shape with a narrowed portion connecting between said foot positions.

6. A skateboard as in claim 1, further comprising:
   a steering handle connecting through said board to a steerable wheel truck positioned below said board element, said steering handle capable of steering said wheel truck.

7. A skateboard as in claim 1, wherein:
   said board element comprises wood.

8. A skateboard as in claim 1, wherein:
   said board element comprises rubber.

9. A skateboard as in claim 1, wherein:
   said board is made of partially translucent molded plastic.

10. A skateboard as in claim 9, wherein:
    said board element includes a battery, wiring connected to said battery, a switch in said wiring, and LED elements connected to said wiring for lighting said board when said switch is switched to an on position.

11. A skateboard as in claim 1, wherein:
    said board element is, from above, a diagonally presented hourglass shape having a non-symmetrical curve between said first and second ends so as to create a larger foot space for pushing off behind said first end portion of said board.

12. A skateboard, comprising:
    a longitudinal board element having a first end and a second end, each disposed respectively on opposed sides of a fore and aft oriented axis of said board;

one wheel truck mounted under each end of said board so as to suspend said board above an underlying surface and enable said board to roll, while loaded, across said surface in the direction of said axis, said board oriented diagonally across said axis with respect to its direction of travel, said board element comprising an hour glass shape for said board element, with foot positions corresponding to wide end portions of said shape with a narrowed portion connecting between said foot positions; wherein, said board is made of partially translucent molded plastic, and said board element includes a battery, wiring connected to said battery, a switch in said wiring, and LED elements connected to said wiring for lighting said board when said switch is switched to an on position.

13. A skateboard as in claim 12, wherein:

said board element hourglass shape has a non-symmetrical curve between said first and second ends so as to create a larger foot space for pushing off behind said first end portion of said board.

* * * * *